US011370571B2

(12) United States Patent
Svärd et al.

(10) Patent No.: US 11,370,571 B2
(45) Date of Patent: Jun. 28, 2022

(54) INDUCTION SEALING DEVICE (71) Applicant: Tetra Laval Holdings & Finance S.A., Pully (CH)

(72) Inventors: Dag Svärd, Lund (SE); Patrik Ingvarsson, Kristianstad (SE); Charlott Friberg, Lund (SE); Marko Stajkovic, Malmö (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 158 days.

(21) Appl. No.: 16/631,606

(22) PCT Filed: Jul. 5, 2018

(86) PCT No.: PCT/EP2018/068223
§ 371 (c)(1),
(2) Date: Jan. 16, 2020

(87) PCT Pub. No.: WO2019/015981
PCT Pub. Date: Jan. 24, 2019

(65) Prior Publication Data
US 2020/0148406 A1 May 14, 2020

(30) Foreign Application Priority Data
Jul. 18, 2017 (EP) .................................. 17181917

(51) Int. Cl.
*B65B 51/22* (2006.01)
*B29C 65/36* (2006.01)
(Continued)

(52) U.S. Cl.
CPC ........ *B65B 51/227* (2013.01); *B29C 65/3656* (2013.01); *B29C 65/3668* (2013.01);
(Continued)

(58) Field of Classification Search
CPC . B29C 70/72; B29C 66/849; B29C 66/72321; B29C 66/4312; B29C 65/7451;
(Continued)

(56) References Cited

U.S. PATENT DOCUMENTS

| 3,684,619 A | * | 8/1972 | Engler et al. ............. B65B 7/14 156/379.7 |
| 3,721,534 A | | 3/1973 | Kubick |

(Continued)

FOREIGN PATENT DOCUMENTS

| CH | 676958 A5 | 3/1991 |
| CN | 102181156 A | 9/2011 |

(Continued)

OTHER PUBLICATIONS

European Search Report in U.S. Appl. No. 17/181,917 dated Jan. 23, 2018, in 8 pages.

(Continued)

*Primary Examiner* — Daniel McNally
(74) *Attorney, Agent, or Firm* — Knobbe, Martens, Olson & Bear, LLP (57) ABSTRACT

An induction sealing device for induction welding of a packaging material is disclosed. In some embodiments, the induction sealing device comprises an inductor coil configured to induce an alternating current in a metal foil of the packaging material for inductive heating thereof. The induction sealing device can further comprise a magnetic insert encapsulating the inductor coil apart from an outer portion of the inductor coil, and the outer portion can be arranged towards the packaging material to be sealed. In some embodiments, the magnetic insert is configured to interact with the packaging material to be sealed via at least one interactive surface. In some embodiments, the induction sealing device comprises a connection unit. The connection (Continued)

unit can comprise a parallel connection configured to connect to the inductor coil and to an AC power source. A corresponding method of manufacturing an induction sealing device is also disclosed.

17 Claims, 8 Drawing Sheets

(51) Int. Cl.
    *B29C 65/74*     (2006.01)
    *B29C 65/00*     (2006.01)
    *B29C 70/72*     (2006.01)
    *B29L 31/00*     (2006.01)

(52) U.S. Cl.
    CPC ...... *B29C 65/7451* (2013.01); *B29C 66/4312* (2013.01); *B29C 66/72321* (2013.01); *B29C 66/849* (2013.01); *B29C 70/72* (2013.01); *B29L 2031/712* (2013.01)

(58) Field of Classification Search
    CPC ............ B29C 65/3668; B29C 65/3556; B65B 51/227; B29L 2031/712
    See application file for complete search history.

(56) References Cited

U.S. PATENT DOCUMENTS

| | | |
|---|---|---|
| 3,808,074 A | 4/1974 | Smith et al. |
| 3,864,186 A | 2/1975 | Balla |
| 4,169,004 A | 9/1979 | Kock et al. |
| 4,506,125 A | 3/1985 | Smets et al. |
| 4,704,509 A | 11/1987 | Hilmersson et al. |
| 4,757,175 A | 7/1988 | Mohr et al. |
| 4,776,980 A | 10/1988 | Ruffini |
| 4,808,326 A | 2/1989 | Tanino et al. |
| 5,200,587 A | 4/1993 | Fang |
| 5,250,140 A | 10/1993 | Hayashi et al. |
| 5,260,535 A | 11/1993 | Holmström et al. |
| 5,418,069 A | 5/1995 | Learman |
| 5,418,811 A | 5/1995 | Ruffini et al. |
| 5,588,019 A | 12/1996 | Ruffini et al. |
| 5,649,407 A | 7/1997 | Blomqvist |
| 5,714,033 A | 2/1998 | Hayashi et al. |
| 5,889,263 A | 3/1999 | Andersson |
| 5,968,399 A | 10/1999 | Selberg |
| 6,167,681 B1 | 1/2001 | Yano et al. |
| 6,216,420 B1 | 4/2001 | Mazzetto et al. |
| 6,503,963 B2 | 1/2003 | Toyoda et al. |
| 6,837,025 B2 | 1/2005 | Kume |
| 7,002,117 B2 | 2/2006 | Thomasset |
| 7,003,934 B1 | 2/2006 | Yano |
| 8,839,597 B2 | 9/2014 | Babini et al. |
| 9,352,869 B2 | 5/2016 | Babini et al. |
| 2002/0108705 A1 | 8/2002 | Kume et al. |
| 2004/0045635 A1 | 3/2004 | Bandyopadhyay et al. |
| 2004/0060928 A1 | 4/2004 | Balla |
| 2004/0182046 A1 | 9/2004 | Babini et al. |
| 2006/0124626 A1 | 6/2006 | Kupfer et al. |
| 2006/0154052 A1 | 7/2006 | Waffenschmidt et al. |
| 2009/0101286 A1 | 4/2009 | Sumeer et al. |
| 2010/0025391 A1 | 2/2010 | Palombini et al. |
| 2010/0155390 A1 | 6/2010 | Hirota |
| 2010/0180545 A1 | 7/2010 | Palmquist et al. |
| 2011/0030315 A1 | 2/2011 | Mancin et al. |
| 2011/0094672 A1 | 4/2011 | Wijk et al. |
| 2013/0263556 A1 | 10/2013 | Babini et al. |
| 2016/0221250 A1 | 8/2016 | Alexandersson et al. |
| 2016/0297121 A1 | 10/2016 | Palmquist et al. |
| 2017/0240309 A1 | 8/2017 | Rubini et al. |

FOREIGN PATENT DOCUMENTS

| | | | |
|---|---|---|---|
| CN | 105073368 A | 11/2015 | |
| EP | 0223517 A2 | 5/1987 | |
| EP | 0225392 A1 | 6/1987 | |
| EP | 0484998 A1 | 5/1992 | |
| EP | 0653899 A2 | 5/1995 | |
| EP | 0730946 A2 | 9/1996 | |
| EP | 1066951 A2 | 1/2001 | |
| EP | 1107358 A2 | 6/2001 | |
| EP | 0 706 945 B1 | 10/2001 | |
| EP | 1231149 A1 | 8/2002 | |
| EP | 1234771 A1 | 8/2002 | |
| EP | 1241098 A1 | 9/2002 | |
| EP | 1300340 A1 | 4/2003 | |
| EP | 1541641 A | 6/2005 | |
| EP | 2008795 A1 | 12/2008 | |
| EP | 2236270 A1 | 10/2010 | |
| EP | 2468480 A1 | 6/2012 | |
| EP | 2781325 A1 | 9/2014 | |
| EP | 3000584 A1 | 3/2016 | |
| FR | 2776616 A1 | 10/1999 | |
| GB | 2506681 A | 4/2014 | |
| JP | S57148619 A | 9/1982 | |
| JP | S63-187591 A | 8/1988 | |
| JP | S63-258729 A | 10/1988 | |
| JP | H04-154564 A | 5/1992 | |
| JP | H08-244728 A | 9/1996 | |
| JP | H09-077006 A | 3/1997 | |
| JP | H10-321361 | 12/1998 | |
| JP | H11-43115 A | 2/1999 | |
| JP | 2004-228043 A | 8/2004 | |
| SE | 434240 B | 7/1984 | |
| WO | WO 1992/015182 A1 | 9/1992 | |
| WO | WO 1997/14547 A1 | 4/1997 | |
| WO | WO 2001/085827 A2 | 11/2001 | |
| WO | WO 2003/053626 A2 | 7/2003 | |
| WO | WO 2003/097332 A1 | 11/2003 | |
| WO | WO 2005/004560 A1 | 1/2005 | |
| WO | WO 2005/105579 A1 | 11/2005 | |
| WO | WO 2007/008131 A2 | 1/2007 | |
| WO | WO 2012/019925 A1 | 2/2012 | |
| WO | WO 2013/045254 A1 | 4/2013 | |
| WO | WO 2014/072477 A1 | 5/2014 | |
| WO | WO 2014/166765 A1 | 10/2014 | |
| WO | WO 2015/036222 A1 | 3/2015 | |
| WO | WO 2015/040173 A1 | 3/2015 | |
| WO | WO 2015/158502 A1 | 10/2015 | |
| WO | WO-2015158502 A1 * | 10/2015 | ........... B29C 66/849 |
| WO | WO 2016/083212 A1 | 6/2016 | |
| WO | WO-2016083212 A1 * | 6/2016 | ........... B29C 66/232 |
| WO | WO 2016/132986 A1 | 8/2016 | |
| WO | WO 2017/089186 A1 | 6/2017 | |
| WO | WO 2017/089187 A1 | 6/2017 | |

OTHER PUBLICATIONS

Search Report and Written Opinion in International Application No. PCT/EP2018/068223, dated Sep. 10, 2018, in 10 pages.
Davis, J.R.; "Practical Design Guidelines for Surface Engineering" Chapter 8, Surface Engineering for Corrosion and Wear Resistance, ASM International, Mar. 2001; eISBN: 9781615030729, pISBN: 9780871707000; pp. 195-229.
European Search Report for Application No. 16167841.2, dated Nov. 11, 2016.
International Search Report and Written Opinion for Application No. PCT/EP2015/056173, dated Aug. 6, 2015.
International Search Report and Written Opinion for Application No. PCT/EP2015/056329, dated Sep. 5, 2014.
International Search Report and Written Opinion for Application No. PCT/EP2017/060146, dated Jul. 18, 2017.
International Search Report and Written Opinion for Application No. PCT/EP2018/068224, dated Sep. 21, 2018.
International Search Report and Written Opinion for PCT/EP2015/076983, dated Feb. 15, 2016.
International Search Report for Application No. PCT/EP2016/077780 dated Feb. 28, 2017.

(56) References Cited

OTHER PUBLICATIONS

International Search Report for Application No. PCT/EP2015/062906, dated Aug. 7, 2015.
International Search Report for Application No. PCT/EP2016/077779 dated Feb. 27, 2017.
Leschynsky et al "Layered Alloys for Effective Magnetic Flux Concentration in Induction Heating," Materials Science-Poland, vol. 25, No. 2, 2007.
Office Action for Swedish Application No. 1551548-9 dated May 30, 2016 in 5 pages.
Office Action in Chinese Application No. 108290352, date Jan. 24, 2019, in 5 pages.
Office Action in European Application No. 14713137 dated Jun. 26, 2018 in 9 pages.
Office Action in Japanese Application No. 2016-562918, dated Mar. 5, 2019.
Office Action received in Chinese Application No. 201580031130.4 dated Jun. 15, 2018 in 19 pages.
Office Action received in Japanese Application No. 2018-527141, dated Oct. 16, 2018, in 5 pages.
European Search Report received in Application No. 17181581.4, dated Jan. 16, 2018, in 7 pages.
European Search Report received in U.S. Appl. No. 17/184,954, dated Jan. 22, 2018, in 6 pages.
Search Report and Written Opinion received in International Application No. PCT/EP2018/070595, dated Sep. 21, 2018, in 10 pages.

* cited by examiner

INDUCTION SEALING DEVICE

TECHNICAL FIELD

The present invention generally relates to the field of induction heating. More particularly, the present invention relates to an induction sealing device for induction welding of a packaging material having at least one layer of metal foil. The present invention also relates to a sealing machine comprising the induction sealing device, and a related method of manufacturing an induction sealing device for induction welding of a packaging material having at least one layer of metal foil.

BACKGROUND

The welding of laminated packing material by means of induction heat is used in the packaging industry. One example of such a laminated material is a carrier layer of paper, aluminium foil and thermoplastic coatings along the inner and outer surfaces of the laminate. The technique of induction welding is based on the fact that the magnetic field around a conductor, generated by an alternating current is capable of inducing a current in an adjoining electrically conducting material, which depending on the resistance of the material, warms up the material. Thus, in induction welding an inductor loop or coil provided against the laminate containing the aluminium foil, and the laminate is pressed together with the material to which it is to be joined. The aluminium foil is heated by means of appropriately chosen current and processing period. The material is heated to a temperature which is high enough to seal adjoining layers of thermoplastic, causing the combined thermoplastic layers to fuse together, thus producing a tight and durable seal.

Typical problems with previous induction sealing devices include difficulties in matching the inductor with other electrical components in the inductive heating circuit, often due to improper quality factors (Q-factors) requiring small tolerances in the circuit, which in turn makes the system less robust in demanding applications such as in high-throughput sealing machines. Small variations of the electrical characteristics of such inductors may thus have significant effect on the electrical matching thereof, which can lead to compromises of the quality of the welded sealings on the packaging containers. Another issue is the amount of heat produced by previous induction sealing devices, which requires more complex designs in order to handle the increased temperatures. Cumbersome manufacturing methods are thus also an issue with previous solutions, further resulting in more difficult customization of the induction sealing devices to varying applications.

Hence, an improved inductive sealing device would be advantageous and in particular allowing for avoiding more of the above mentioned problems and compromises, including improving the robustness of the inductive sealing device in the inductive heating circuit to facilitate the sealing process optimization in high speed sealing systems. A related sealing machine comprising such induction sealing device would also be advantageous as well as an improved and facilitated method of manufacturing such induction sealing device.

SUMMARY

Accordingly, examples of the present invention preferably seek to mitigate, alleviate or eliminate one or more deficiencies, disadvantages or issues in the art, such as the above-identified, singly or in any combination by providing a device according to the appended patent claims.

According to a first aspect an induction sealing device for induction welding of a packaging material for producing sealed packages of pourable food products is provided. The packaging material has at least one layer of metal foil. The induction sealing device comprises an inductor coil configured to induce an alternating current in the metal foil for inductive heating of the packaging material, and a magnetic insert encapsulating the inductor coil apart from an outer portion thereof to be arranged towards the packaging material to be sealed. The magnetic insert is configured to interact with the packaging material to be sealed via at least one interactive surface. The induction sealing device comprises a connection unit. The connection unit comprises a parallel connection to the inductor coil and being configured for connection to an AC power source.

According to a second aspect a method of manufacturing an induction sealing device for induction welding of a packaging material is provided. The packaging material has at least one layer of metal foil. The method comprises providing an inductor coil configured to induce an alternating current in the metal foil for inductive heating of the packaging material, and encapsulating the inductor coil with a magnetic insert apart from an outer portion thereof to be arranged towards the packaging material to be sealed. The method comprises further providing at least one interactive surface of the magnetic insert to interact with the packaging material to be sealed, and providing a connection unit comprising a parallel connection to the inductor coil and being configured for connection to an AC power source.

According to a third aspect a sealing machine for sealing of packaging material is provided. The sealing machine comprises at least one induction sealing device according to the first aspect or at least one induction sealing device manufactured according to the method of the second aspect.

Further examples of the invention are defined in the dependent claims, wherein features for the second, third, and fourth aspects of the disclosure are as for the first aspect mutatis mutandis.

Some examples of the disclosure provide for an induction sealing device for induction welding of a packaging material having a reduced inductance.

Some examples of the disclosure provide for an induction sealing device for induction welding of a packaging material that provides for an electrically more robust induction heating circuit.

Some examples of the disclosure provide for an induction sealing device for induction welding of a packaging material that is easier to match with other electrical components in an induction heating circuit.

Some examples of the disclosure provide for an induction sealing device for induction welding of a packaging material having a quality factor (Q) that provides for a more robust matching with other electrical components in an induction heating circuit.

Some examples of the disclosure provide for an induction sealing device for induction welding of a packaging material that allows for lowering the voltage applied in the induction sealing application.

Some examples of the disclosure provide for an induction sealing device for induction welding of a packaging material that produce a reduced amount of heat when operating.

Some examples of the disclosure provide for an induction sealing device for induction welding of a packaging material that is more compact.

Some examples of the disclosure provide for an induction sealing device for induction welding of a packaging material that is easier to manufacture.

Some examples of the disclosure provide for an induction sealing device for induction welding of a packaging material that is more easily provided in varying geometries.

Some examples of the disclosure provide for an induction sealing device for induction welding of a packaging material that allows for increased stability in the electrical parameters of the inductive heating circuit applied for the welding.

Some examples of the disclosure provide for an induction sealing device for induction welding of a packaging material that allows for improved control of the sealing process.

Some examples of the disclosure provide for more reliable sealing of packaging material containers.

Some examples of the disclosure provide for an increased throughput in an inductive sealing production line.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the invention are capable of will be apparent and elucidated from the following description of examples of the present invention, reference being made to the accompanying drawings, in which.

DETAILED DESCRIPTION

Specific examples of the invention will now be described with reference to the accompanying drawings. This invention may, however, be embodied in many different forms and should not be construed as limited to the examples set forth herein; rather, these examples are provided so that this disclosure will be thorough and complete, and will fully convey the scope of the invention to those skilled in the art. The terminology used in the detailed description of the examples illustrated in the accompanying drawings is not intended to be limiting of the invention. In the drawings, like numbers refer to like elements.

Figure 1:
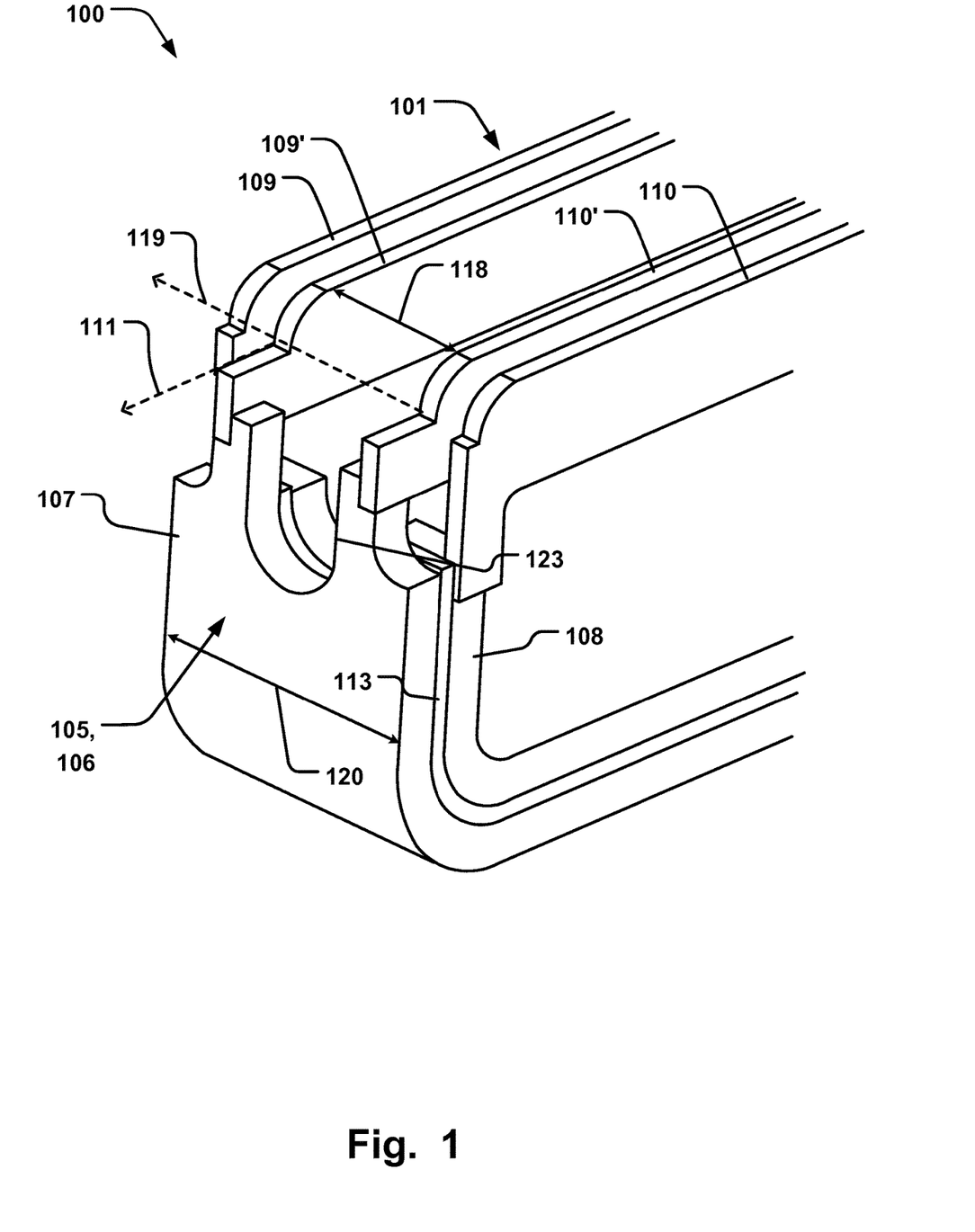
FIG. 1 is a schematic illustration, in a perspective view, of a section of an induction sealing device according to an example of the disclosure.

FIG. 1 is a schematic illustration, in a perspective view, of a part of an induction sealing device 100 for induction welding of a packaging material (not shown) for producing sealed packages of pourable food products. The packaging material has at least one layer of metal foil in its laminate material structure. FIG. 1 is a magnified view of a first end 112 of the induction sealing device 100 schematically illustrated in FIG. 2. The induction sealing device 100 comprises an inductor coil 101 configured to induce an alternating current in the metal foil of the packaging material for inductive heating thereof. FIG. 3a is a cross-sectional view of the induction sealing device 100 taken along a longitudinal direction 111 thereof. The induction sealing device 100 comprises a magnetic insert 102 encapsulating the inductor coil 101 apart from an outer portion 103 of the inductor coil 101 to be arranged towards the packaging material to be sealed (not shown), as schematically illustrated in FIG. 3a. The magnetic insert 102 is configured to interact with the packaging material to be sealed via at least one interactive surface 104. The interactive surface 104 of the magnetic insert 102 is thus arranged against the packaging material. The magnetic insert 102 may comprise a magnetic flux concentrating insert. The magnetic flux concentrating insert may comprises a magnetic compound of a polymer and soft magnetic particles. The soft magnetic particles may be ferrite, NiZn ferrite, FeSiAl, nanocrystaline alloys such as FeSiB and its derivatives or FeNi-alloys and its derivatives. As illustrated in e.g. FIG. 1, the induction sealing device 100 comprises a connection unit 105. The connection unit 105 comprises a parallel connection 106 to the inductor coil 101 and is configured for connection to an AC power source. The parallel connection of the inductor coil 101 is further schematically illustrated in FIG. 4. Providing the magnetic insert 102 to encapsulate the inductor coil 101 apart from an outer portion 103 thereof while having the inductor coil 101 coupled to the connection unit 105 via a parallel connection 106 provides for maintaining the energy delivery required to induce a sufficient heating of the packaging material while lowering the operating temperature of the induction sealing device 100. This provides for facilitated manufacturing of the induction sealing device 100 since the amount of heat to be dissipated is reduced, allowing e.g. for a wider range of materials to be used. Materials for e.g. supporting structures (as discussed further below with respect to support material 114) may thus be chosen to be easily moldable, such as polymers, to facilitate the manufacturing, as opposed to e.g. metal alloys. This allows also for forming more complex support structures for easier optimization of the induction sealing device 100 to various applications, and previously cumbersome integration can be avoided. Providing the magnetic insert 102 to encapsulate the inductor coil 101 apart from an outer portion 103 thereof while having the inductor coil 101 coupled to the connection unit 105 via a parallel connection 106 advantageously provides for lowering the operating voltage of the induction sealing device 100, and further to decrease the inductance of the induction sealing device 100. Lowering of the inductance provides for achieving a quality factor (Q-value) that improves the electrical matching capabilities of the induction heating circuit of e.g. a sealing machine.

The Q-value can thus be reduced and thereby provide for a less narrow range in which the electrically matched parameters are optimized. Fluctuations in the electrically parameters of the inductive heating circuit are thus not detrimental to the inductive sealing process, and a more robust system is provided. This is particularly beneficial in demanding sealing applications of packaging containers in high-speed production lines where the electrical characteristics of the induction sealing devices 100 can be subject to variations over time. A more reliable sealing of packaging material containers in such applications can thus be provided, allowing for increased throughput.

Figure 2:
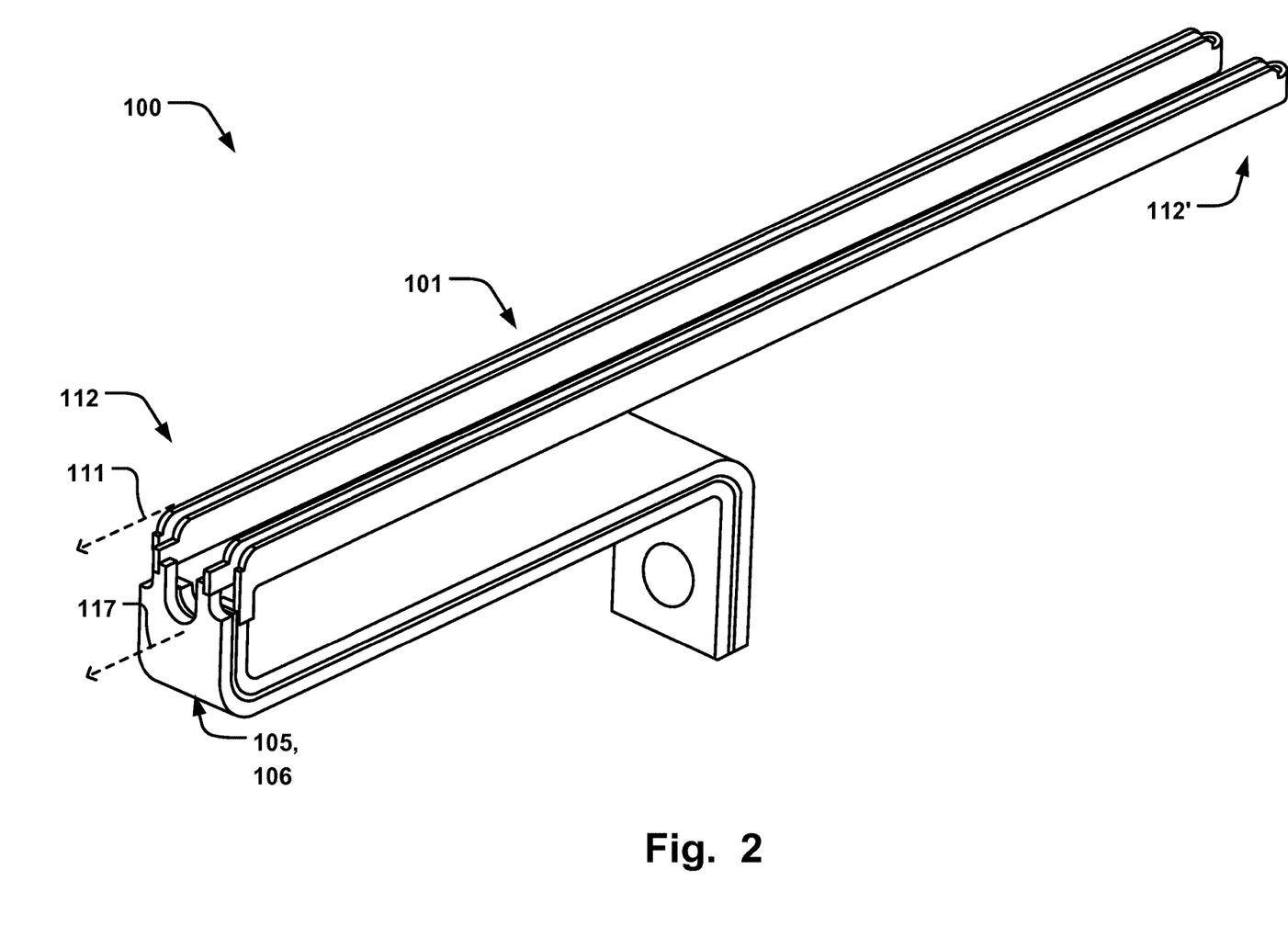
FIG. 2 is a schematic illustration, in a perspective view, of an induction sealing device according to an example of the disclosure.
Figure 3A:
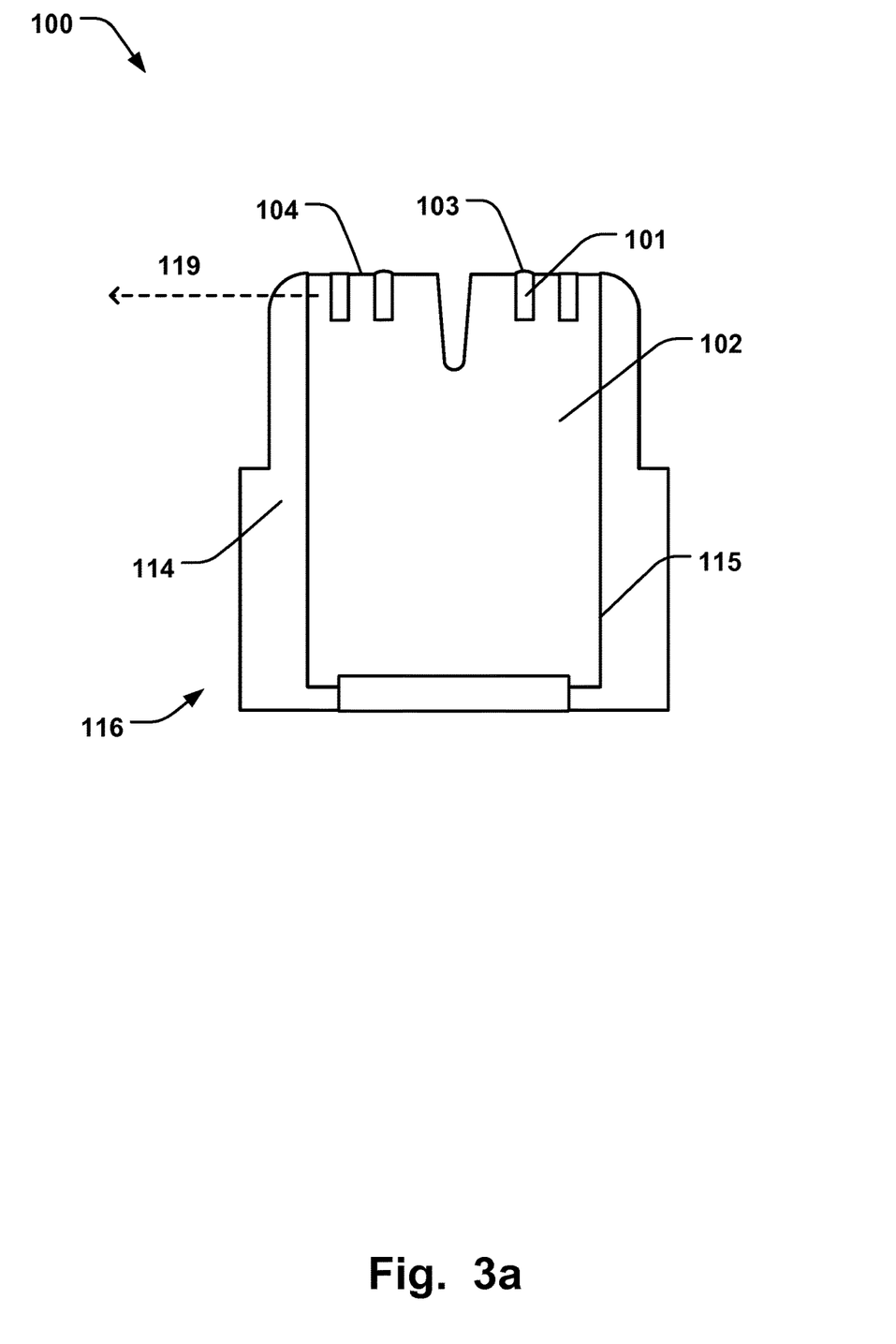
FIGS. 3a-b are schematic illustrations, in cross-sectional side views, of an induction sealing device according to examples of the disclosure.
Figure 4:
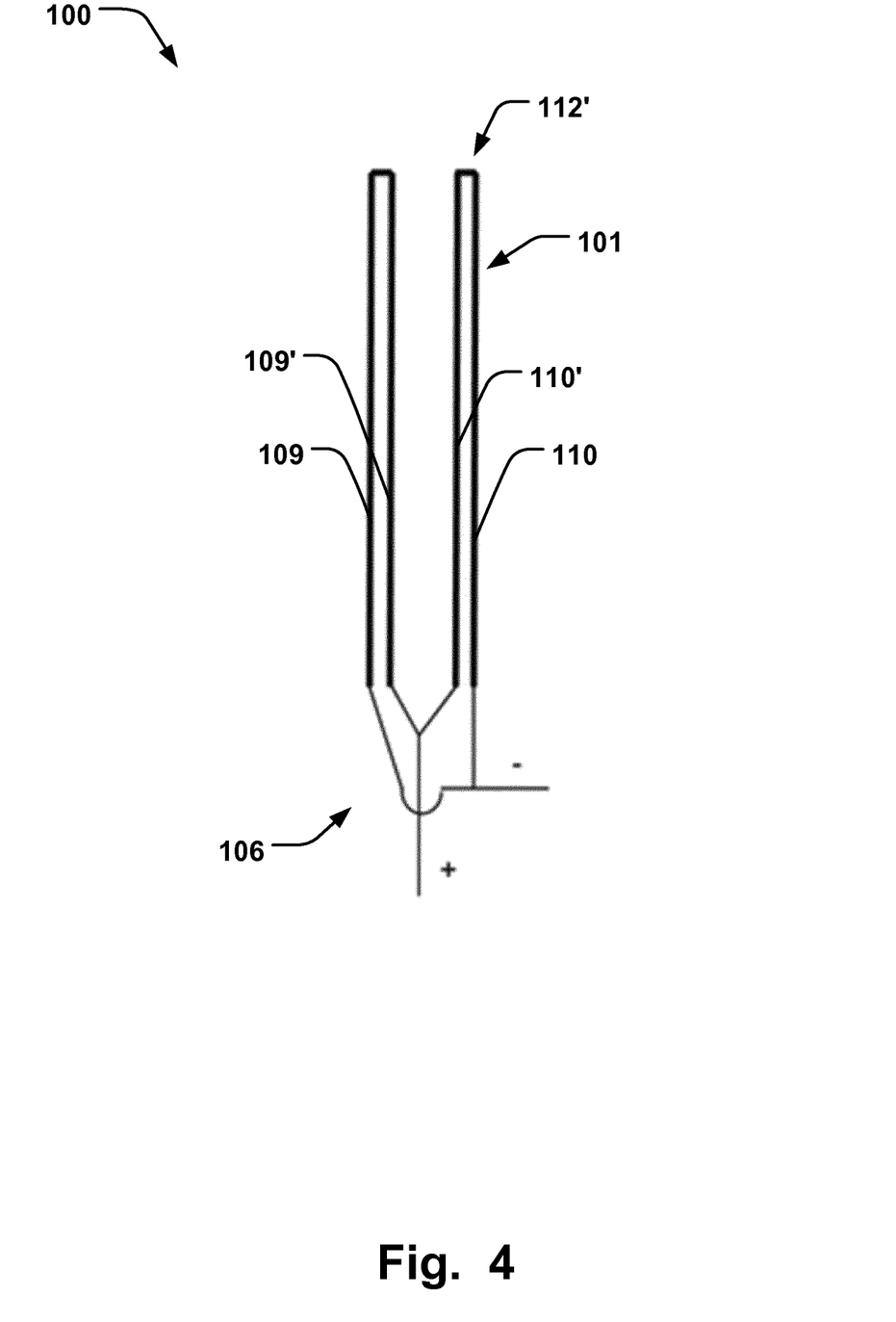
FIG. 4 is a schematic illustration of an electrical connection diagram of an inductor coil of an induction sealing device according to an example of the disclosure.

The inductor coil 101 may extend in a longitudinal direction 111 between opposite first and second ends 112, 112', thereof as schematically illustrated in FIG. 2. The connection unit 105 may be arranged at the first end 112. The inductor coil 101 may comprise a first pair of inductor bars 109, 109', and a second pair of inductor bars 110, 110', as illustrated in e.g. FIGS. 1 and 4. The first and second pairs of inductor bars 109, 109', 110, 110', may be arranged to extend parallel to each other along the longitudinal direction 111 of the inductor coil 101. The inductor bars 109, 109', 110, 110', of each respective pair may further be connected to eachother at the second end 112'. The inductor bars 109, 109', of e.g. the first pair may accordingly be connected at the second end 112' as illustrated in FIG. 4, to form a continuous connection loop with a turning point at the second end 112', and vice versa for the inductor bars 110, 110', of the second pair. The first and second pairs of inductor bars 109, 109', 110, 110', are connected to the connection unit 105 at the first end 112. This provides for a compact and efficient induction sealing device 100.

The connection unit 105 may comprise first 107 and second 108 connector elements coupled to the first and second pairs of inductor bars 109, 109', 110, 110', of the inductor coil 101. Thus, at the first end 112, each of the first and second connector elements 107, 108, may be coupled to one inductor bar of the first pair of inductor bars 109, 109', and to one inductor bar of the second pair of inductor bars 110, 110'. A compact induction sealing device 100 may thus be provided facilitating the lowering of the inductance if the inductor coil 101 with the advantageous effects as described above. As illustrated in the example of FIG. 1, the first connector element 107 may be connected to inductor bar 109' of the first pair of inductor bars, and to inductor bar 110' of the second pair of inductor bars. Accordingly, the second connector element 108 may be connected to inductor bar 109 of the first pair of inductor bars, and to inductor bar 110 of the second pair of inductor bars.

At the first end 112, each of the first and second connector elements 107, 108, may have a flat shape and extend in respective first and second planes arranged in parallel to each other. Further, the aforementioned first and second planes may have a normal direction 117 extending in parallel with the longitudinal direction 111, as schematically illustrated in e.g. FIGS. 1 and 2.

Having the planes of the first and second connector elements 107, 108, extending parallel to each other provides for the first and second connector elements 107, 108, to be arranged in close proximity to each other and a compact connection unit 105 and thereby an induction sealing device 100 with a reduced inductance, which is further improved by arranging the normal direction 117 of the respective planes to extend in parallel with the longitudinal direction 111.

The first and second planes of the respective first and second connector elements 107, 108, may be separated by a sheet of electrically isolating material 113, as schematically illustrated in e.g. FIG. 1. The first and second connector elements 107, 108, may accordingly be arranged with a reduced profile in the longitudinal direction 111, allowing for the lowering of the inductance of the induction sealing device 100 as discussed. The sheet of electrically isolating material may have a thickness of approximately 0.5 mm to allow for particularly small profile while maintaining the necessary electrical separation.

Figure 5:
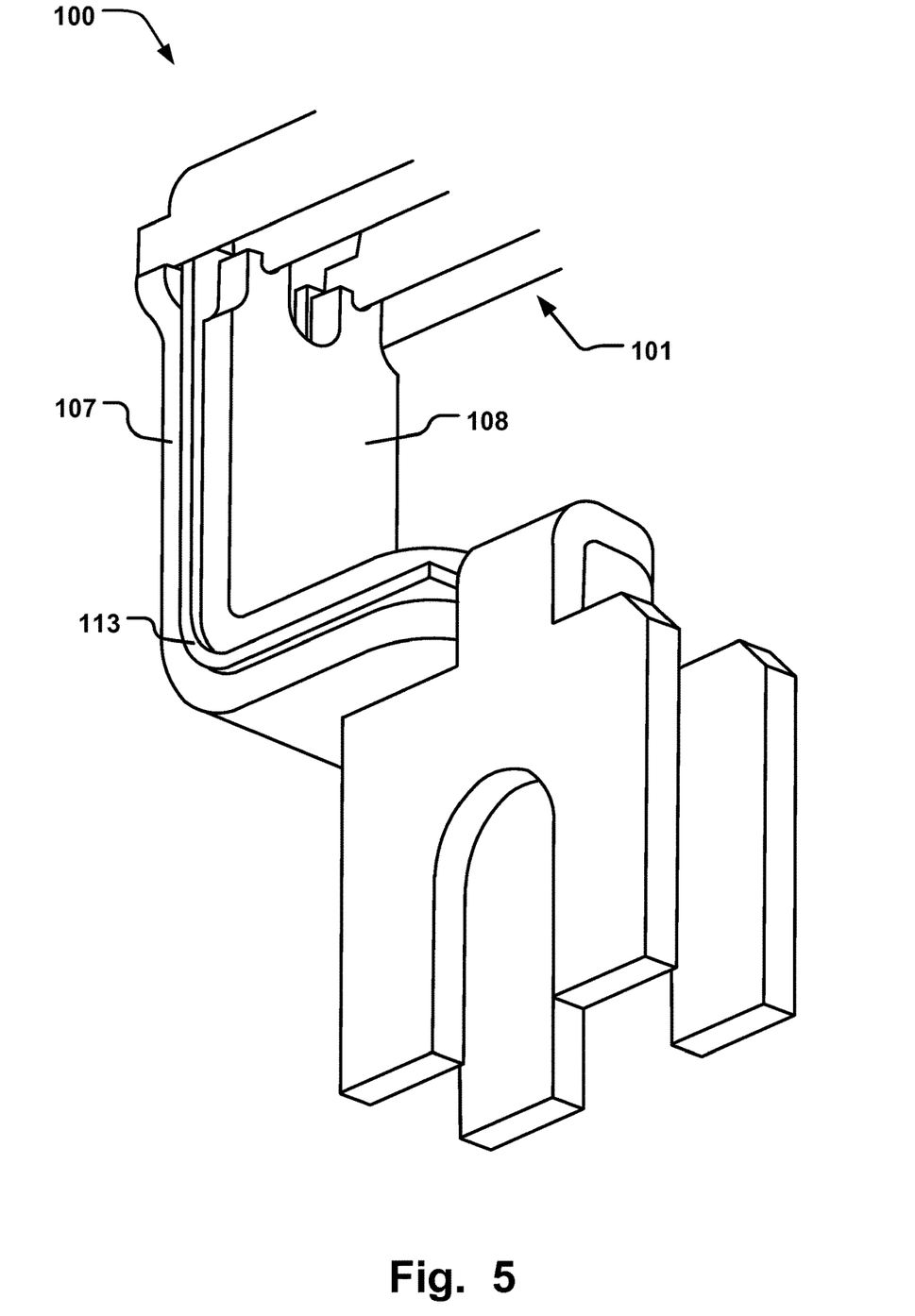
FIG. 5 is a schematic illustration, in a perspective view, of a section of an induction sealing device according to an example of the disclosure.

The first pairs of inductor bars 109, 109', may be separated from the second pair of inductor bars 110, 110', with a separation distance 118 in a transverse direction 119 being perpendicular to the longitudinal direction 111. The first 107 and/or second 108 connector element may extend in a respective plane, as described above. The respective plane of the first 107 and/or second 108 connector element may have a width 120 in the transverse direction 119 corresponding to at least the separation distance 118, as schematically illustrated in FIG. 1. Having a width 120 corresponding to at least the separation distance 118 allows for an increased amount of current to flow along the respective surfaces of the first 107 and/or second 108 connector element. In the example of FIG. 1, the width 120 corresponds substantially to the width of the widest separation distance by which the inductor bars of the first pair 109, 109', are separated from the inductor bars of the second pair 110, 110', i.e. the separation distance between inductor bar 109 of the first pair and the inductor bar 110 of the second pair. Such further increased surface area of the respective planes of the first 107 and/or second 108 connector element may allow for further increasing the amount of current to flow along the respective surfaces. The height of the respective planes of the first 107 and/or second 108 connector elements, i.e. in a direction perpendicular to the transverse and longitudinal directions 111, 119, may also be optimized with respect to the surface area to allow for an increased current transport. An uninterrupted width 120 may thus be maintained substantially from a position of the first and second pairs of inductor bars 109, 109', 110, 110', along the side of the induction sealing device 100 at least along a distance where the magnetic insert extends. A recess 123 may be provided in the planes of the first 107 and/or second 108 connector elements between the first and second pairs of inductor bars 109, 109', 110, 110'. FIG. 5 illustrates another example in this regard where the surface area of the mentioned planes has been optimized to transport an increased amount of current. The sheet of electrically isolating material 113 may thus extend along the entire height of the first 107 and/or second 108 connector elements.

As mentioned, the first pairs of inductor bars 109, 109', may be separated from the second pair of inductor bars 110, 110', with a separation distance 118 in a transverse direction 119 perpendicular to the longitudinal direction 111. Further, the inductor bars 109', 110', connected to the first connector element 107 may be arranged opposite each other and separated from each other by the separation distance 118. Thus, the inductor bars 109', 110', may face each other as illustrated in the example of FIG. 1, so that the current is transported in the same direction of these adjacent inductor bars 109', 110'. The current may thus also be transported in the same direction in the outer inductor bars 109, 110, connected to the second connector element 108.

Figure 6:
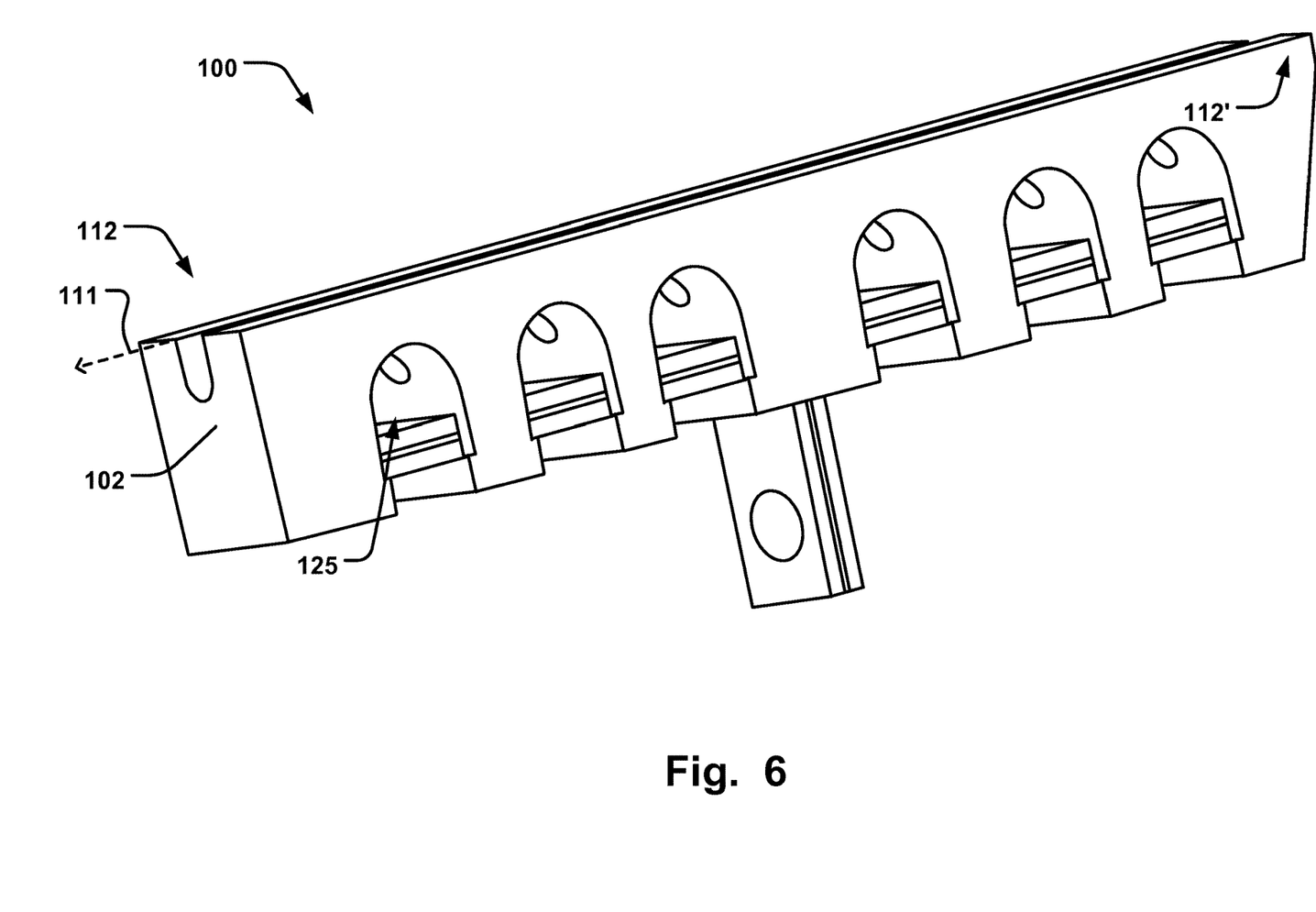
FIG. 6 is a schematic illustration, in a perspective view, of an induction sealing device according to an example of the disclosure.

The magnetic insert 102 may encapsulate the first and second connector elements 107, 108. FIG. 6 illustrates an example of the induction sealing device 100 where the magnetic insert 102 has been arranged to enclose the first and second connector elements 107, 108, to provide for an improved and more efficient induction sealing device 100. The magnetic insert 102 may be molded to enclose the first and second connector elements 107, 108, thus facilitating the manufacturing procedure of the induction sealing device 100.

The induction sealing device 100 may comprise a support material 114 arranged to enclose the magnetic insert 102 apart from said interactive surface 104, as schematically illustrated in e.g. FIG. 3a. The support material 114 provides for increasing the mechanical integrity of the induction sealing device 100, and also for adapting the shape thereof for integration into various sealing applications. As elucidated above, the lowering of the temperature of the induction sealing device 100, provides for a greater variety of support materials 114 to be used, and facilitated manufacturing and adaptability to different sealing applications. The support material 114 may be molded to assume various configurations around the magnetic insert 102. This facilitates the manufacturing and more complex structures can be provided without the need for e.g. milling and otherwise forming of support structures of various alloys previously required in order to transport the larger amount of heat away from the inductor coil 101. The support material 114 may thus comprise a polymer.

Hence, the support material 114 may comprise a shape formed around the magnetic insert 102 by a molding process.

Figure 3B:
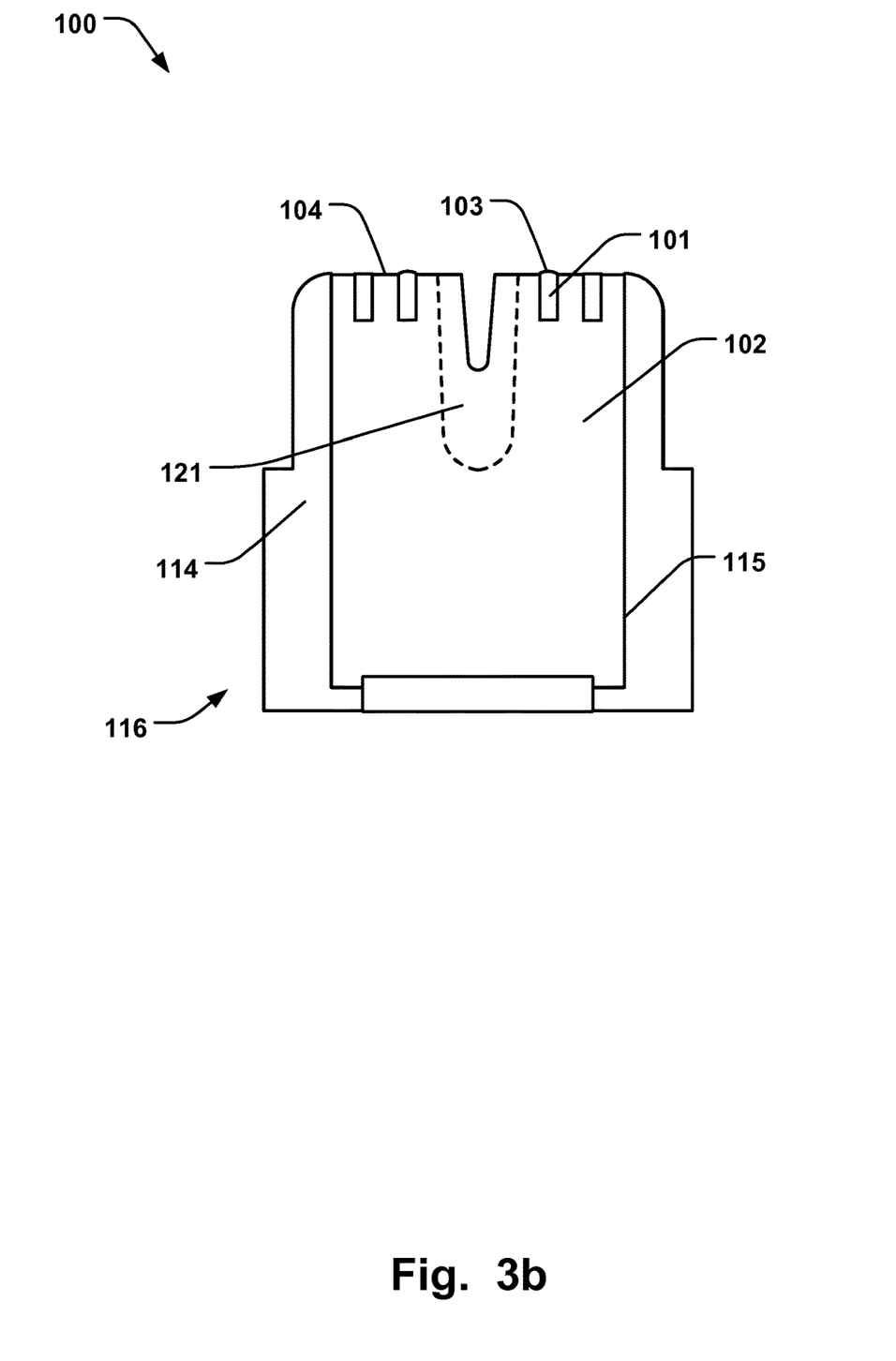

The induction sealing device may comprise a reinforced portion 121 arranged between the first and second pair of inductor bars 109, 109', 110, 110', as illustrated in FIG. 3b. The reinforced portion 121 may thus be arranged around a recess between the first and second pair of inductor bars 109, 109', 110, 110', where a cutting device may move to cut the packaging material after being sealed. The magnetic insert 102 may thus be shielded from such cutting device. The reinforced portion 121 may be connected to the support material 114 enclosing the magnetic insert 102, and thus also be supportive in maintaining the support material 114 in place around the magnetic insert 102. The reinforced portion 121 may comprise the support material 114. Thus, the reinforced portion 121 may be provided simultaneously as the magnetic insert 102 is provided to enclosed the support material 114, e.g. by a molding process. I.e. the support material 114 may propagate into the position of the reinforced portion 121, forming a connection between the reinforced portion 121 and the outer support material 114 enclosing the magnetic insert 102. FIG. 6 illustrates an example of having cavities 125 of the induction sealing device 100 into which the support material 114 may propagate in a molding process to the position of the reinforced portion 121.

As illustrated in the example of FIG. 3a, the support material 114 may comprise a substantially u-shaped form to receive the magnetic insert 102 which may have a substantially rectangular outline 115 in a cross-sectional plane 116 perpendicular to the longitudinal direction 111 in which the inductor coil 101 extends. This may provide for a particularly robust induction sealing device 100 and a facilitated manufacturing procedure.

Figure 7A:
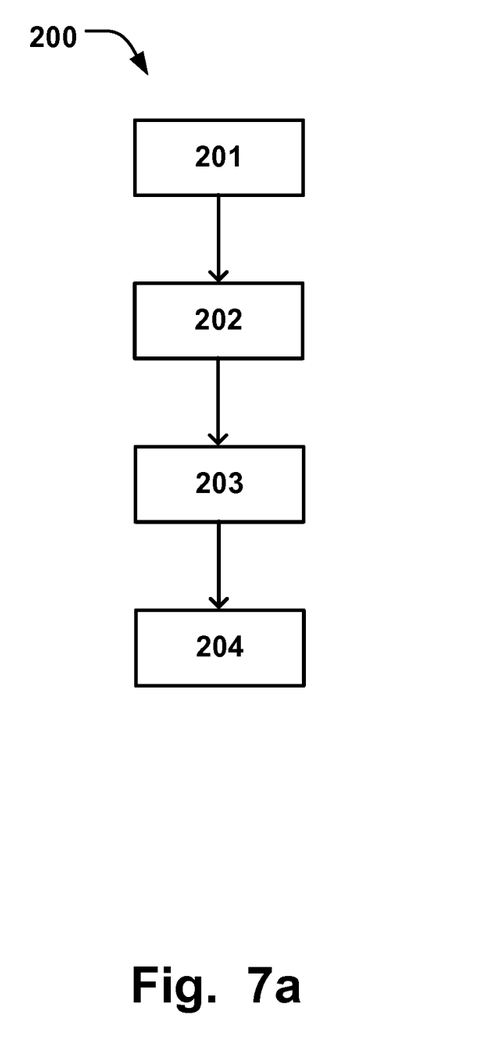
FIGS. 7a-b are flowcharts of a method of manufacturing an induction sealing device for induction welding of a packaging material according to examples of the disclosure.

FIG. 7a illustrates a flow chart of a method 200 of manufacturing an induction sealing device 100 for induction welding of a packaging material. The order in which the steps of the method 200 are described and illustrated should not be construed as limiting and it is conceivable that the steps can be performed in varying order. A method 200 is thus provided, comprising providing 201 an inductor coil 101 configured to induce an alternating current in the metal foil for inductive heating of the packaging material. The method 200 comprises encapsulating 202 the inductor coil 101 with a magnetic insert 102 apart from an outer portion 103 thereof to be arranged towards the packaging material to be sealed. The method 200 further comprises providing 203 at least one interactive surface 104 of the magnetic insert 102 to interact with the packaging material to be sealed, and providing 204 the inductor coil 101 with a connection unit 105 comprising a parallel connection 106 configured for connection to an AC power source. The method 200 thus provides for the advantageous benefits as described above in relation to the induction sealing device 100 in conjunction with FIGS. 1-6.

Figure 7B:
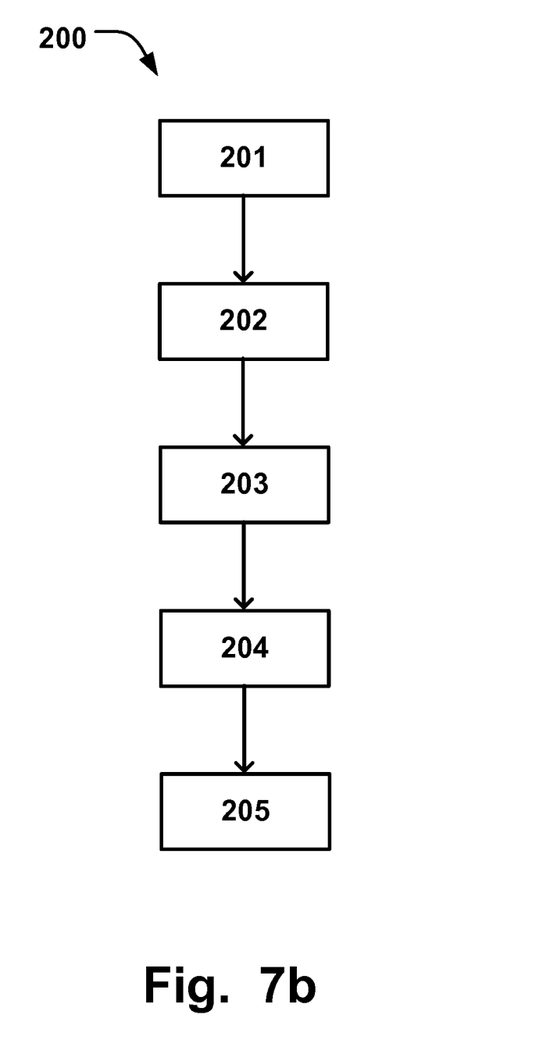

FIG. 7b illustrates a further flow chart of a method 200 of manufacturing an induction sealing device 100 for induction welding of a packaging material having at least one layer of metal foil. The order in which the steps of the method 200 are described and illustrated should not be construed as limiting and it is conceivable that the steps can be performed in varying order. The method 200 may comprise molding 205 a support material 114 to enclose the magnetic insert 102 apart from said interactive surface 104. As elucidated above, this facilitates the manufacturing and more complex structures can be provided without the need for e.g. milling and otherwise forming of support structures of various alloys. The support material may thus comprise a polymer.

A sealing machine (not shown) for sealing of packaging material is provided. The sealing machine comprises at least one induction sealing device 100 as described above in relation to FIGS. 1-6, or at least one induction sealing device 100 manufactured according to the method 200 as described above in relation to FIGS. 7a-b. The sealing procedure of packaging material in the sealing machine can thus be improved due to the advantageous effects described above, and in particular allowing for an improved control of the sealing process, a more reliable sealing and ultimately increased throughput in an inductive sealing production line.

The present invention has been described above with reference to specific examples. However, other examples than the above described are equally possible within the scope of the invention. The different features and steps of the invention may be combined in other combinations than those described. The scope of the invention is only limited by the appended patent claims.

More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used.

The invention claimed is:

1. An induction sealing device for induction welding of a packaging material for producing sealed packages of pourable food products, the packaging material having at least one layer of metal foil, the induction sealing device comprising:
   an inductor coil configured to induce an alternating current in the at least one layer of metal foil for inductive heating of the packaging material, wherein:
      the inductor coil extends in a longitudinal direction between opposite first and second ends thereof;
      the inductor coil comprises a first pair of inductor bars and a second pair of inductor bars;
      the first and second pairs of inductor bars extend parallel to each other along the longitudinal direction of the inductor coil; and
      the inductor bars of each respective pair are connected to each other at the second end of the inductor coil;
   a magnetic insert encapsulating the inductor coil apart from an outer portion of the inductor coil, said outer portion configured to be arranged towards the packaging material to be sealed, wherein the magnetic insert is configured to interact with the packaging material to be sealed via at least one interactive surface;
a connection unit arranged at the first end of the inductor coil and configured to connect to a power source, wherein the connection unit comprises first and second connector elements coupled to the first and second pairs of inductor bars of the inductor coil, wherein, the first connector element contacts a first one of the first pair of inductor bars at a first connection point and contacts a first one of the second pair of inductor bars at a second connection point, and wherein the first connector element comprises a recess extending from an end of the first connector element and arranged between the first and second connection points; and
a sheet of electrically isolating material sandwiched in between the first and second connector elements, said sheet being separate from said magnetic insert.

2. The induction sealing device according to claim 1, further comprising a support material arranged to enclose the magnetic insert apart from said at least one interactive surface.

3. The induction sealing device according to claim 2, wherein the support material comprises a polymer.

4. The induction sealing device according to claim 2, wherein the magnetic insert comprises a substantially rectangular outline in a cross-sectional plane, said cross-sectional plane being perpendicular to a longitudinal direction in which the inductor coil extends.

5. The induction sealing device according to claim 2, wherein the support material comprises a shape formed around the magnetic insert by a molding process.

6. The induction sealing device according to claim 1, wherein each of the first and second connector elements are coupled to one of the first pair of inductor bars and to one of the second pair of inductor bars at the first end of the inductor coil, and wherein, at the first end of the inductor coil, each of the first and second connector elements has a flat shape and extends in respective first and second planes arranged in parallel to each other, and wherein the first and second planes have a normal direction extending in parallel with the longitudinal direction.

7. The induction sealing device according to claim 6, wherein the first pair of inductor bars are separated from the second pair of inductor bars by a separation distance in a transverse direction perpendicular to the longitudinal direction, and wherein at least one of the first and second connector elements has a width extending in a respective plane in the transverse direction corresponding to at least the separation distance.

8. The induction sealing device according to claim 1, wherein the sheet of electrically isolating material has a thickness of approximately 0.5 mm.

9. The induction sealing device according to claim 1, wherein the first pair of inductor bars are separated from the second pair of inductor bars by a separation distance in a transverse direction perpendicular to the longitudinal direction, wherein the inductor bars connected to the first connector element are arranged opposite each other and separated from each other by the separation distance.

10. The induction sealing device according to claim 1, wherein the magnetic insert encapsulates the first and second connector elements.

11. The induction sealing device according to claim 1, further comprising a reinforced portion arranged between the first and second pair of inductor bars and a support material arranged to enclose the magnetic insert apart from said at least one interactive surface, wherein the reinforced portion comprises the support material.

12. The induction sealing device according to claim 1, wherein said recess is arch shaped.

13. A method of manufacturing an induction sealing device for induction welding of a packaging material, the packaging material having at least one layer of metal foil, the method comprising:
providing an inductor coil configured to induce an alternating current in the at least one layer of metal foil for inductive heating of the packaging material, wherein:
the inductor coil extends in a longitudinal direction between opposite first and second ends thereof;
the inductor coil comprises a first pair of inductor bars and a second pair of inductor bars;
the first and second pairs of inductor bars extend parallel to each other along the longitudinal direction of the inductor coil; and
the inductor bars of each respective pair are connected to each other at the second end of the inductor coil;
encapsulating the inductor coil with a magnetic insert apart from an outer portion of the inductor coil, said outer portion configured to be arranged towards the packaging material to be sealed, wherein the magnetic insert comprises at least one interactive surface configured to interact with the packaging material to be sealed;
providing a connection unit configured to connect to a power source, wherein the connection unit comprises first and second connector elements coupled to the first and second pairs of inductor bars of the inductor coil, wherein the first connector element contacts a first one of the first pair of inductor bars at a first connection point and contacts a first one of the second pair of inductor bars at a second connection point, and wherein the first connector element comprises a recess extending from an end of the first connector element and arranged between the first and second connection points; and
providing a sheet of electrically isolating material sandwiched in between the first and second connector elements, said sheet being separate from said magnetic insert.

14. The method of manufacturing the induction sealing device according to claim 13, further comprising:
molding a support material to enclose the magnetic insert apart from said at least one interactive surface.

15. The method of manufacturing the induction sealing device according to claim 14, wherein the support material comprises a polymer.

16. An induction sealing device for induction welding of a packaging material for producing sealed packages of pourable food products, the packaging material having at least one layer of metal foil, the induction sealing device comprising:
an inductor coil configured to induce an alternating current in the at least one layer of metal foil for inductive heating of the packaging material, wherein:
the inductor coil extends in a longitudinal direction between opposite first and second ends thereof;
the inductor coil comprises a first pair of inductor bars and a second pair of inductor bars;
the first and second pairs of inductor bars extend parallel to each other along the longitudinal direction of the inductor coil; and
the inductor bars of each respective pair are connected to each other at the second end of the inductor coil;

a magnetic insert encapsulating the inductor coil apart from an outer portion of the inductor coil, said outer portion configured to be arranged towards the packaging material to be sealed, wherein the magnetic insert is configured to interact with the packaging material to be sealed via at least one interactive surface; and a connection unit arranged at the first end of the inductor coil and comprising a parallel connection configured to connect to the inductor coil and configured to connect to an AC power source, wherein the connection unit comprises first and second connector elements coupled to the first and second pairs of inductor bars of the inductor coil, and wherein, at the first end of the inductor coil, each of the first and second connector elements are coupled to one of the first pair of inductor bars and to one of the second pair of inductor bars;

wherein the first connector element contacts a first one of the first pair of inductor bars at a first connection point and contacts a first one of the second pair of inductor bars at a second connection point; and wherein the first connector element comprises a recess extending from an end of the first connector element and arranged between the first and second connection points to increase an amount of current transported by the first connector element to the first ones of the first and second pairs of inductor bars.

17. The induction sealing device according to claim 16, wherein said recess is arch shaped.

* * * * *